United States Patent [19]

Tusinski et al.

[11] 3,917,077

[45] Nov. 4, 1975

[54] AUTOMATIC LENS MOLD GASKET STRIPPER

[75] Inventors: Joseph Tusinski, Colonial Heights; Daniel Bobeau, Hopewell, both of Va.

[73] Assignee: Coburn Optical Industries, Inc., Muskogee, Okla.

[22] Filed: Feb. 15, 1974

[21] Appl. No.: 442,989

[52] U.S. Cl. .............................. 214/1 R; 264/334
[51] Int. Cl.² .......................................... B28B 7/12
[58] Field of Search ............ 214/1 R; 264/334, 335, 264/336; 425/440, 441, 808

[56] References Cited
UNITED STATES PATENTS

| | | | |
|---|---|---|---|
| 2,625,283 | 1/1953 | Watts | 214/310 |
| 3,142,106 | 7/1964 | Wise et al. | 425/440 |
| 3,528,135 | 9/1970 | Reiterman | 425/808 X |

*Primary Examiner*—Frank E. Werner
*Attorney, Agent, or Firm*—John J. Byrne; Edward E. Dyson

[57] ABSTRACT

A machine for automatically removing the gaskets from opthalmic lens molds is the subject of this invention. The apparatus includes a piston operated ram having means to receive a lens mold. A stripper head is located directly above this piston. During the stripping operation, the ram forces the lens mold and gasket into the stripper at which time the gasket is contacted by a circular stripper rim having a diameter slightly less than the outside diameter of the gasket but more than the outside diameter of the ram. The stripper rim holds the gasket stationary as the ram forces the mold components into the stripper head itself. The gasket is thereby peeled from the mold and causes it to fall like a collar about the piston. As the ram is withdrawn, the lens mold (without the gasket) is received by a take away chute. As the ram is withdrawn further, a ram bushing strips the gasket from the ram and an air nozzle directs the gasket toward a separate chute. The stripper head includes a centering cam for aligning the lens mold assembly with respect to the stripper rim and further includes a spring-loaded plunger internal to the stripper head to urge the de-gasketed lens mold from the stripper head after the ram has been withdrawn. An automatic loading chute, with an indexing gate, feeds the lens molds to the ram. The movements of the machine components are controlled by air or hydraulic cylinders operated by conventional programming devices.

7 Claims, 6 Drawing Figures

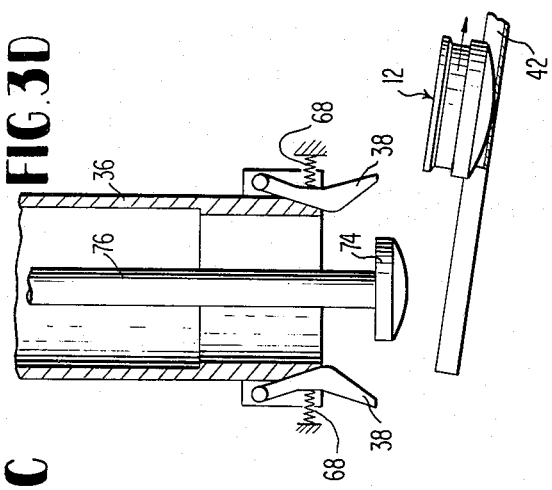
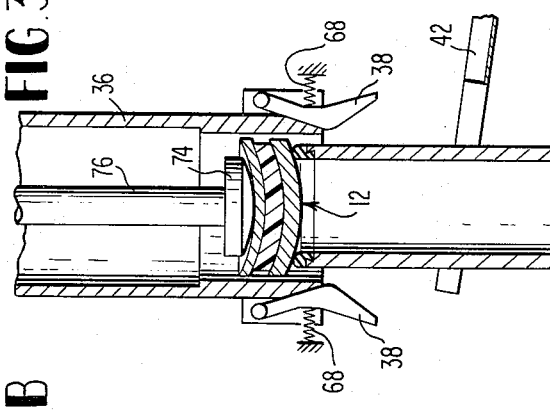
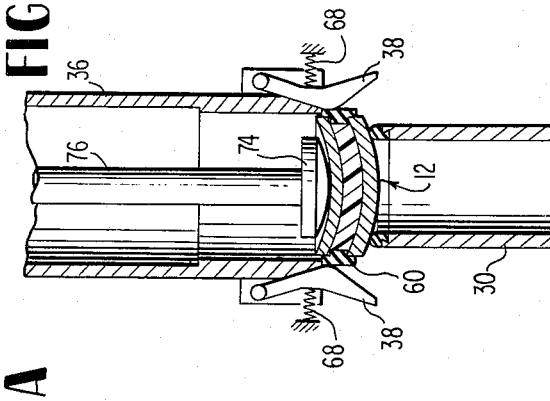
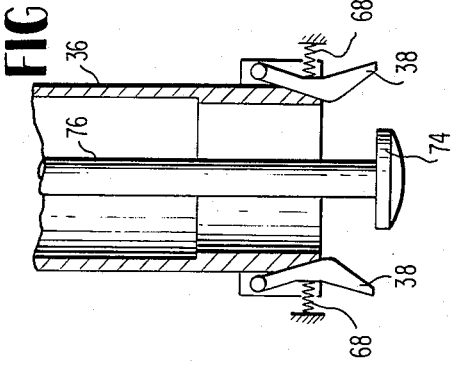
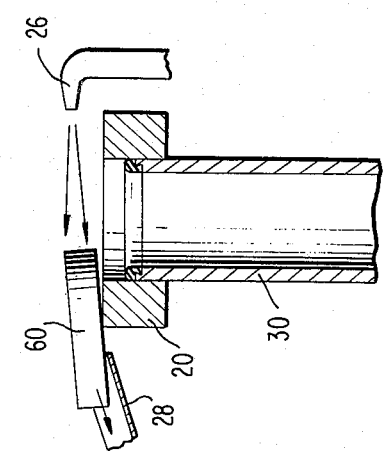
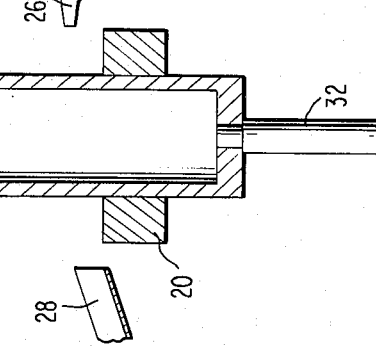
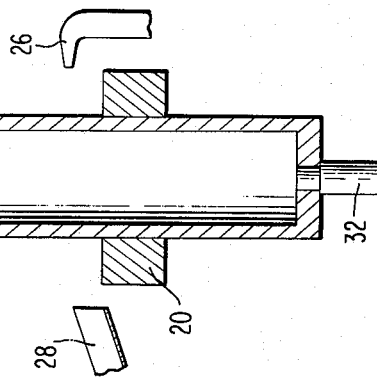
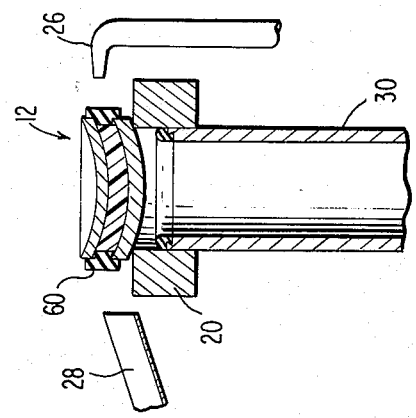

AUTOMATIC LENS MOLD GASKET STRIPPER

BACKGROUND OF THE INVENTION

1. Field of the Invention

This invention relates to an apparatus for automatically stripping an elastomeric gasket from an opthalmic lens mold assembly.

2. Description of the prior art

Many modern plastic lenses are produced by a molding process in which a thermosetting plastic is injected into the cavity between a pair of positive and negative dies contoured to desired curvatures. Characteristically there is a peripheral spacing between the positive and negative dies which is surrounded by an annular elastomeric gasket. The gasket serves to prevent the thermosetting plastic from escaping and also defines the periphery of the lens being molded. Typical lens mold assemblies and gaskets are disclosed by Schrier Pat. No. 3,070,846 and Weinbert Pat. No. 3,056,166. While the making of plastic lenses by such methods has been a tedious manual operation, recent developments in new machinery has allowed this process to become automated, with increasing efficiencies and a consequent improvement in production rates. Because production rates have increased it has been necessary to find a means for quickly removing the finished lens from the lens mold after the lens material has cured. This operation is normally performed manually and with a great deal of lost motion. In some instances, prior art lens molds have included a tab on the gasket which may be used to identify the particular gasket and to facilitate the stripping of the gasket from the two die halves. Unfortunately, the manual stripping of gaskets from lens molds is a time-consuming and inefficient operation. In order to decrease the inefficiencies involved with stripping gaskets from lens molds, the subject invention provides an automatic lens mold gasket stripper which eliminates many of the problems associated with the manual removing of gaskets from lens molds. The prior art discloses devices such as Mott, Pat. No. 2,901,210, in which one elastomeric annular band may be removed from one element to another by means of a stripping collar. However, the improvements over devices of this type will be readily apparent from the descritpion to follow.

SUMMARY OF THE INVENTION

The basic invention includes two essential elements — a ram means for carrying the gasketed lens mold and a stripper head for removing the gasket from the mold. In operation, a lens mold is placed on the head of a ram element when the ram is in its withdrawn position. The ram is forced upwardly by a piston means causing the gasket to contact the stripper rim of a stripper head. Continued movement of the ram forces the lens mold into an internal cavity in the stripper head while the stripper ram peels the gasket from the moving assembly. The liberated gasket is then free to fall down the ram like a collar. As the ram is withdrawn, the degasketed lens mold is removed by a take away chute. The continued withdrawal of the ram draws the head of the ram into a ram busihing which strips the gasket from the ram member itself. At this point, the gasket is blown from the ram bushing by means of an air assist device and is removed by a take away chute.

It is therefore an object of the present invention to increase the speed and efficiency of plastic lens making operations.

It is another object of the present invention to automatically strip gaskets from opthalmic lens molds.

It is yet another object of the present invention to automatically feed lens molds to an automatic gasket stripper apparatus.

It is a still further object of the present invention to separate lens molds and gaskets after the stripping operation is completed.

These and other objects and advantages of the invention will be more fully understood upon a reading of the following specification taken in view of the attached drawings.

BRIEF DESCRIPTION OF THE DRAWINGS

FIGS. 3A–D are diagrammatic cross-sectional views of the stripper head and ram assembly during sequential steps of the stripping operation.

DETAILED DESCRIPTION OF THE DRAWINGS

With reference to the following drawings, like elements will be numbered with like numerals in the different views.

Figure 1:
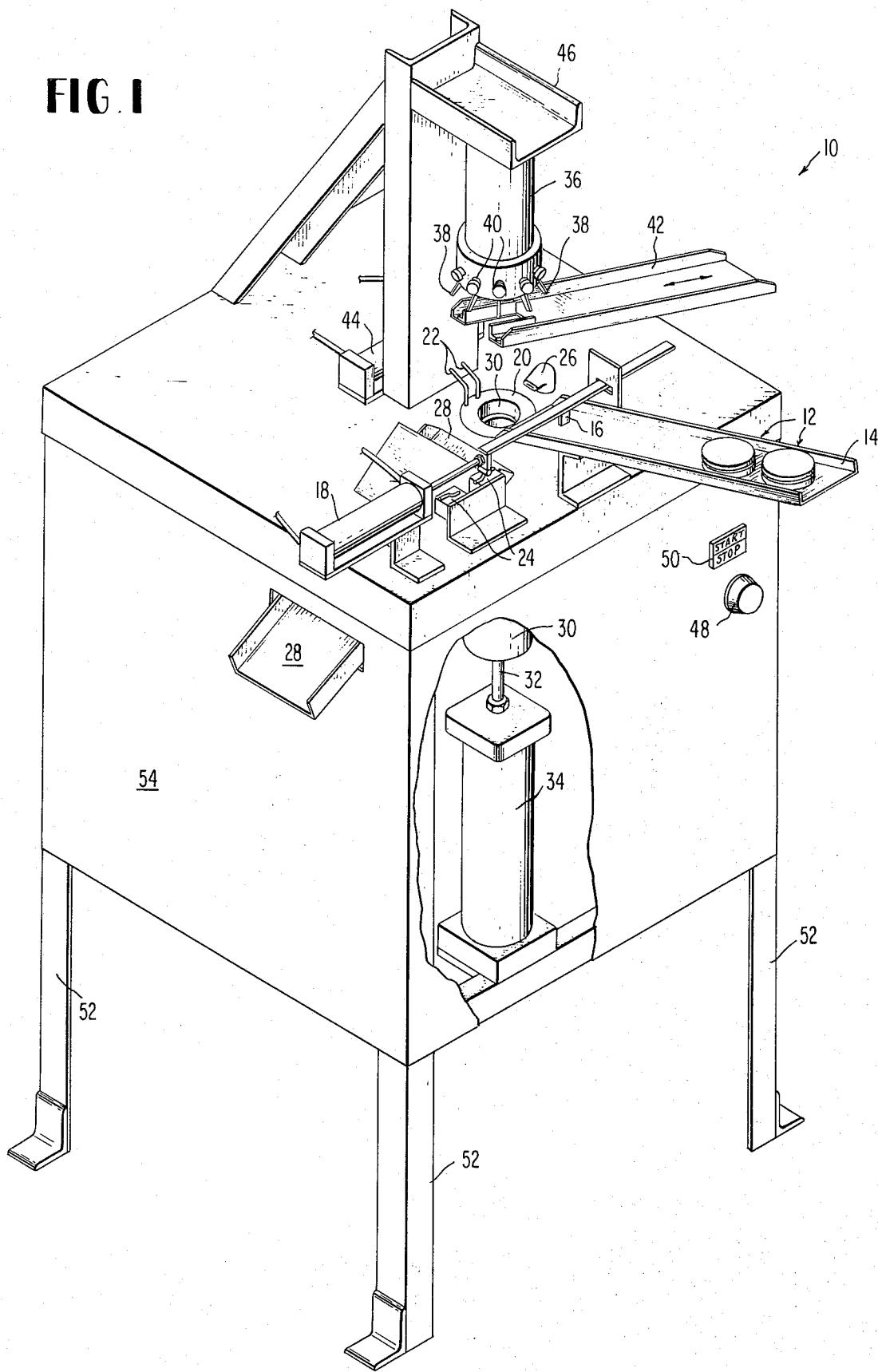
FIG. 1 is an isometric perspective of an automatic lens mold gasket stripper.

An automatic lens mold gasket stripper 10 according to the present invention is illustrated in the isometric elevation of FIG. 1. A plurality of assembled lens molds 12 are arranged on loading shoot 14 directly in front of an indexing gate 16. The molds 12 have been cooled and are ready for stripping. The indexing gate 16 is controlled by a cylinder 18. When the piston associated with cylinder 18 is fully extended, an indexing gate 16 prevents the descent of lens mold 12 down incline loading shoot 14. However, when the piston is withdrawn the gate 16 permits a single lens mold to advance into a position over a ram bushing 20. Stops 22 prevent the lens mold 12 from going beyond the ram bushing 20. A pair of microswitches 24 associated with cylinder 18 control the stroke of the cylinder piston. An air ejection nozzle 26 is positioned adjacent to ram bushing 20. The purpose of the air ejection nozzle 26 is to blow the gasket from the ram bushing after the ram has been withdrawn into the bushing. An inclined gasket take away chute 28 receives the gaskets ejected by the nozzle.

A ram assembly 30 is connected, via piston 32, to a prime mover cylinder 34. Located directly above ram assembly 30 is a stripper head 36. A plurality of centering cam levers 38 are equally spaced about the periphery of the lower end of the stripper head. Associated with each lever is an adjust screw 40 which controls the tension on the cams. A lens mold take away chute 42 is located directly below stripper head 36 and directly above the ram assembly 30. A take away chute 42 is moveable in the horizontal plane. The piston of chute 42 is controlled by a cylinder 44 and an associated piston rod which is obscured in the view of FIG. 1. The purpose of take away chute 42 is to collect the lens molds without its gasket after the stripping operation has taken place. During the stripping operation, take away chute 42 is withdrawn from the area of the stripping head 36 but as the ram retreats subsequent to the stripping of the gasket, the take away chute moves into position to receive the lens mold assembly from the stripper head. The receiving end of take away chute 42 is forked to provide a gap just slightly larger than the diameter of the ram assembly 30. Therefore, take away chute 42 is positioned directly under the stripper head as the ram is withdrawn.

The operation of the automatic lens mold gasket stripper 10 is controlled by push-button 48. An indicating light 50 denotes whether the automatic device is operating or not. The sequencing of the operations associated with the automatic gasket stripper 10 is controlled by any one of a variety of standard programming devices (not shown). Such control devices are well-known to those of ordinary skill in the art and may, for instance, be a series of programmed cams or similar machine controlling apparatus. The use of limit switches such as microswitches 24 are used in conjunction with conventional sequencing devices so as to signal the end of one operation and the beginning of another.

The entire machine assembly is carried by a frame 52 which is secured to the floor in a conventional fashion. A plurality of stainless steel sheet panels 54 provide a dust proof enclosure for ram assembly 30, 32 and 34. A more detailed description of the ram assembly and stripper head may be had with reference to FIG. 2.

Figure 2:
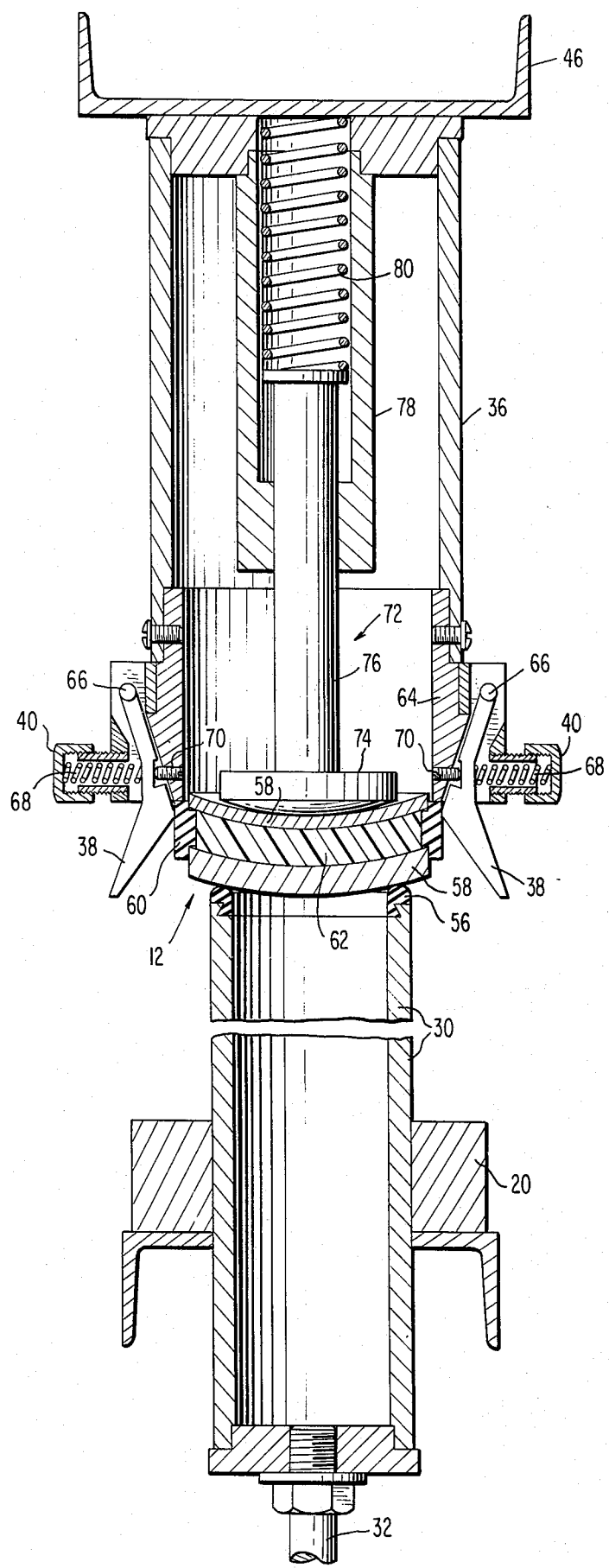
FIG. 2 is a cross-sectional view of the ram and stripper head assemblies.

FIG. 2 shows the ram assembly 30 and the stripper head 36 in cross-section with the ram near the top of its stroke. Lens mold assembly 12 is shown seated on the mounting ring 56 secured to the top of ram 30. The cross-sectional view of the lens mold assembly 12 is shown to include a pair of upper and lower dies 58 and an annular elastomeric gasket 60. The cavity defined between the two dies and the annular gasket is typically filled with a thermo-setting type of plastic resin 62 which has been cured into opthalmic lens. FIG. 2 shows the operation to be at that point in the cycle where the gasket 60 just comes into contact with stripper rim 64. It is clear from FIG. 2 that the inside diameter of stripper rim 64 is slightly less than the outside diameter of gasket 60, yet greater than the inside diameter of gasket 60. In turn the inside diameter of gasket 60 is slightly larger than the outside diameter of ram 30 so that when gasket 60 is stripped from lens mold assembly 12 it is free to fall like a collar around ram assembly 30. As gasket 60 falls it is caused to stop on the top surface of ram bushings 20.

Centering cams 38 are mounted around the periphery of stripper rims 64 in a manner discussed with respect to FIG. 1. It will be noted that centering cam 38 pivots around point 66 and is urged toward the center of the stripper head by spring 68 whose tension is controlled in the manner previously described by adjustment screws 40. A plurality set screws 70 control the position of centering cams 38 and the pressure they exert upon gasket 60. The purpose of the centering cam assembly is to align the lens mold gasket 60 so that it comes into uniform and open contact with stripper rim 64. It will be noted that as the ram lifts the lens mold assembly into the proximity of the centering cam, cam levers will tend to urge the gasket into correct operating position.

Internal to the stipper head is a plunger mechanism 72. The plunger includes a head means 74, a shaft 76, a housing 78 and a loading spring 80. Plunger head 74 is convexly contoured to approximate the curvature of the upper die element 58. The purpose of plunger mechanism 74 is to expel the lens mold from the interior of stripper head 36 after the gasket 60 has been removed by stripper rim 64. The expelling energy is provided by the potential energy of spring 80 which is compressed as ram 30 forces lens molding assembly 12 into the interior of stripper head 36. The operating sequences of the automatic lens mold gasket stripper will be better understood with reference to the drawings, 3A–3D.

At the beginning of the operating cycle (FIG. 3A) ram 30 is withdrawn to the fullest of its stroke and a lens mold assembly 12 is positioned on ram bushing 20 in the manner previously described with respect to FIG. 1. A pair of stops 22 prevent the lens mold assembly 12 from travelling beyond the cycle initiation point. After the lens molding assembly 12 is positioned on ram bushing 20, the ram means 30 carries it into contact with stripper head 36 as shown in FIG. 3B. FIG. 3B exemplifies a point in time identical to that illustrated in FIG. 2. Centering cams 38 have at this point aligned lens mold assembly 12 with respect to stripper rim 64 so that pressure is applied evenly and uniformly to the gasket as the ram progresses upwardly. As the ram 30 continues its stroke it forces the lens mold assembly into the interior of stripper head 36. Because stripper rim 64 holds gasket 60 stationary it is peeled away from lens assembly 12 and is free to fall down ram shaft 30 as indicated in FIG. 3C. At this time cylinder 44 draws lens mold take away chute 42 under stripper head assembly 36 for the purpose of receiving the degasketed lens mold. FIG. 3D shows the operating cycle after ram 30 has been fully withdrawn. Inclined take away away chute 42 has intercepted the lens mold assembly 12 and removed it from the area of the stripper head. Meanwhile gasket 60 which had come to rest on ram bushing 20 is blown onto gasket take away chute 28 by a timed blasted air from ejection nozzle 26 completing a cycle of operations. The attaratus is then ready to receive another lens mold as illustrated in FIG. 3A. By repeating the sequence a plurality of lens mold may be stripped rapidly and efficiently.

While a specific embodiment of the present invention has been disclosed, it will be obvious to those of ordinary skill in the art that certain changes can be made without departing from the spirit of the invention. For instance, while the use of air cylinders is preferred, it is clear that a variety of other devices such as hydraulic cylinders, servo mechanisms or solenoids may be employed. Likewise while the lens mold of the illustrated embodiment is shown as being circular in shape, it is clear that lens molds having irregular contours could be stripped in a similar manner. Moreover, while the specific sequence controlling device could be patterned cam valve arrangement, it is well known to those of ordinary skill in the art that many other types of programming devices would be satisfactory.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

We claim:

1. A stripping mechanism for removing an annular gasket from a mold assembly of a type having the annular gasket circumscribing the peripheries of a pair of spaced lens molds comprising,
   a framework,
   a ram means supported on said framework along an axis,
   a piston extending outwardly from said ram along said axis,
   a circular mold assembly supporting rim at the end of said piston having an outside diameter less than the diameters of said molds,
   a generally hollow stripper head located directly opposite said ram along said axis,
   a stripping rim at that end of said head closest to said ram having an effective inside diameter less than the outside diameter of said gasket but greater than that of said peripheries,
   power means sequentially moving said ram and said stripper relative to one another along said axis from a first position wherein said head is spaced from said supporting rim a sufficient distance to enable a mold assembly to be placed thereon to a second position wherein said ram is received into the interior of said head, whereby said stripper rim will peel said gasket from said lens mold as it is moved from said first position to said second position.

2. The apparatus of claim 1 wherein a centering cam means is mounted on said stripper head for evenly aligning said gasket with respect to said stripper rim.

3. The apparatus of claim 2 wherein said centering cam means comprises a plurality of spring-loaded, pivoted levers located about the periphery of said stripper rim.

4. The apparatus of claim 3 wherein said power means comprises an air cylinder connected to said ram means.

5. The apparatus of claim 4 further comprising input indexing means for selectively feeding said lens mold to said ram.

6. The apparatus of claim 5 wherein said input indexing means comprises,
   an inclined chute for collecting said molds, and
   a cylinder operated gate for allowing only one lens mold to pass to said ram at any one time.

7. The apparatus of claim 3 wherein said power means comprises a hydraulic cylinder connected to said ram means.

* * * * *